United States Patent
Batchelor et al.

(10) Patent No.: US 7,219,259 B2
(45) Date of Patent: *May 15, 2007

(54) APPARATUS AND METHOD TO PRESERVE DATA INTEGRITY DURING A POWER LOSS

(75) Inventors: Gary W. Batchelor, Tucson, AZ (US); Carl E. Jones, Tucson, AZ (US); Robert A. Kubo, Tucson, AZ (US); Gregg S. Lucas, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 463 days.

This patent is subject to a terminal disclaimer.

(21) Appl. No.: 10/912,641

(22) Filed: Aug. 5, 2004

(65) Prior Publication Data

US 2006/0031714 A1 Feb. 9, 2006

(51) Int. Cl.
*G06F 11/00* (2006.01)

(52) U.S. Cl. .......................... 714/14; 714/8

(58) Field of Classification Search ................ 714/14, 714/7, 8; 369/17, 53.41; 711/154
See application file for complete search history.

(56) References Cited

U.S. PATENT DOCUMENTS

| | | | |
|---|---|---|---|
| 5,315,691 A | 5/1994 | Sumiya et al. | |
| 5,928,367 A | 7/1999 | Nelson et al. | |
| 5,938,771 A | 8/1999 | Williams et al. | |
| 5,940,862 A * | 8/1999 | Erickson et al. | 711/154 |
| 5,946,714 A * | 8/1999 | Miyauchi | 711/205 |
| 6,000,018 A * | 12/1999 | Packer et al. | 711/154 |
| 6,574,699 B1 * | 6/2003 | Dobbek | 711/4 |
| 2006/0028947 A1 * | 2/2006 | Elliott et al. | 369/53.41 |
| 2006/0028948 A1 * | 2/2006 | Batchelor et al. | 369/53.41 |
| 2006/0031601 A1 * | 2/2006 | Elliott et al. | 710/22 |
| 2006/0031630 A1 * | 2/2006 | Batchelor et al. | 711/112 |
| 2006/0031714 A1 * | 2/2006 | Batchelor et al. | 714/14 |

* cited by examiner

*Primary Examiner*—Dieu-Minh Le
(74) *Attorney, Agent, or Firm*—Chandler & Udall, LLP; Dale F. Regelman

(57) ABSTRACT

A method is disclosed to preserve data integrity during loss of power to an information storage and retrieval system. Applicants' method converts a plurality of sectors having a first sector format to a plurality of sectors having a second sector format. If a power failure warning is received during the sector format conversion process, the method prefetches the next second sector, overlays the next first sector onto part of all of that prefetched second sector, and saves the newly-written second sector before loss of utility power. After restoration of utility power to the information storage and retrieval system, Applicants' method writes that newly-written second sector to an information storage medium.

20 Claims, 7 Drawing Sheets

APPARATUS AND METHOD TO PRESERVE DATA INTEGRITY DURING A POWER LOSS

FIELD OF THE INVENTION

This invention relates to an apparatus and method to preserve data integrity when an ongoing sector format conversion process is interrupted by a power loss.

BACKGROUND OF THE INVENTION

Data storage and retrieval systems are used to store information provided by one or more host computer systems. Such data storage and retrieval systems receive requests to write information to one or more secondary storage devices, and requests to retrieve information from those one or more secondary storage devices. Upon receipt of a write request, the system stores information received from a host computer in a data cache. In certain implementations, a copy of that information is also stored in a nonvolatile storage device. Upon receipt of a read request, the system recalls information from the one or more secondary storage devices and moves that information to the data cache. Thus, the system is continuously moving information to and from storage devices, and to and from the data cache.

Applicants' invention includes a sector format conversion device which in the event data disposed in the data cache is written in a first sector format and the data disposed in the one or more storage devices is written in a second sector format, converts data comprising the first sector format into data comprising the second sector format. Applicants' apparatus and method preserve data integrity throughout the sector conversion process even during a power failure. In certain embodiments, Applicants' apparatus and method are compliant with the Power Failure Warning protocols under the SFF-8045 Specification.

SUMMARY OF THE INVENTION

Applicants' invention includes a method to preserve data integrity during loss of power to an information storage and retrieval system. Applicants' method provides an information storage and retrieval system comprising information comprising (N) first sectors written in a first sector format, a device controller, a data storage device, where that data storage device comprises an information storage medium comprising (M) second sectors each comprising a second sector format, a sector format conversion device, a communication link interconnecting the sector format conversion device and the device controller, where the sector format conversion device is interconnected with the data storage device.

Applicants' method sends the (i)th first sector to the sector format conversion device, and overlays that (i)th first sector onto part or all of the (j)th second sector. The method then transmits the (j)th second sector to the data storage device, and writes that (j)th second sector to the information storage medium. Applicants' method determines if a power failure warning is received, and if a power failure warning is received the method prefetches the (j)+1th second sector, overlays the (i+1)th first sector onto part of all of said (j)+1 th second sector, and saves that (j)+1th second sector before loss of utility power. After restoration of utility power to the information storage and retrieval system, Applicants' method destages the (j)+1th second sector to the data storage device, and encodes that (j)+1th second sector to the information storage medium.

BRIEF DESCRIPTION OF THE DRAWINGS

The invention will be better understood from a reading of the following detailed description taken in conjunction with the drawings in which like reference designators are used to designate like elements, and in which.

DETAILED DESCRIPTION OF THE PREFERRED EMBODIMENTS

This invention is described in preferred embodiments in the following description with reference to the Figures, in which like numbers represent the same or similar elements. The invention will be described as embodied in an information storage and retrieval system which includes two clusters, a plurality of host adapters, a plurality of device adapters, and a data cache. The following description of Applicant's method to preserve data integrity when an ongoing sector format conversion process is interrupted by a power loss is not meant, however, to limit Applicant's invention to data processing applications, as the invention herein can be applied to preservation of data integrity in general.

Figure 1:
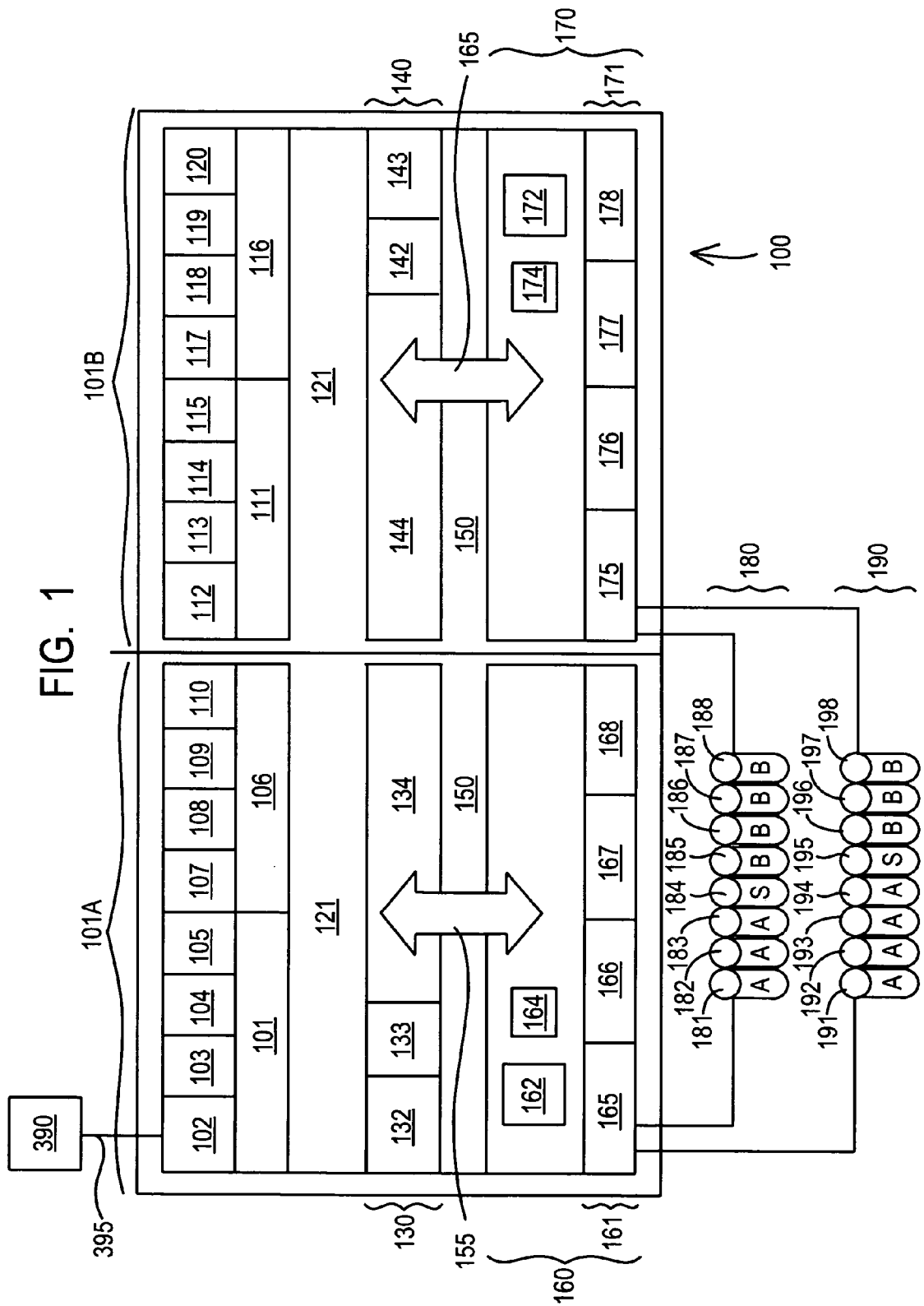
FIG. 1 is a block diagram showing one embodiment of Applicants' data storage and retrieval system.

Referring now to FIG. 1, information storage and retrieval system 100 is capable of communication with host computer 390 via communication link 395. The illustrated embodiment of FIG. 1 shows a single host computer. In other embodiments, Applicants' information storage and retrieval system is capable of communicating with a plurality of host computers.

Host computer 390 comprises a computer system, such as a mainframe, personal computer, workstation, and combinations thereof, including an operating system such as Windows, AIX, Unix, MVS, LINUX, etc. (Windows is a registered trademark of Microsoft Corporation; AIX is a registered trademark and MVS is a trademark of IBM Corporation; and UNIX is a registered trademark in the United States and other countries licensed exclusively through The Open Group.) In certain embodiments, host computer 390 further includes a storage management program. The storage management program in the host computer 390 may include the functionality of storage management type programs known in the art that manage the transfer of data to a data storage and retrieval system, such as the IBM DFSMS implemented in the IBM MVS operating system.

In certain embodiments, Applicants' information storage and retrieval system 100 includes a plurality of host adapters 102–105, 107–110, 112–115, and 117–120, disposed in four host bays 101, 106, 111, and 116. In other embodiments, Applicants' information storage and retrieval system includes fewer than 16 host adapters. Regardless of the number of host adapters disposed in any embodiments of Applicants' system, each of those host adapters comprises a shared resource that has equal access to both central processing/cache elements 130 and 140. Each host adapter may comprise one or more Fibre Channel ports, one or more FICON ports, one or more ESCON ports, or one or more SCSI ports. Each host adapter is connected to both clusters through interconnect bus 121 such that each cluster can handle I/O from any host adapter.

Processor portion 130 includes processor 132 and cache 134. In certain embodiments, processor portion 130 further includes memory 133. In certain embodiments, memory device 133 comprises random access memory. In certain embodiments, memory device 133 comprises non-volatile memory.

Processor portion 140 includes processor 142 and cache 144. In certain embodiments, processor portion 140 further includes memory 143. In certain embodiments, memory device 143 comprises random access memory. In certain embodiments, memory device 143 comprises non-volatile memory.

I/O portion 160 comprises a plurality of device adapters, such as device adapters 165, 166, 167, and 168. I/O portion 170 further comprises a plurality of device adapters, such as device adapters 175, 176, 177, and 178.

In certain embodiments of Applicants' system, one or more host adapters, processor portion 130, and one or more device adapters, are packaged together on a single card disposed in Applicants' information storage and retrieval system. Similarly, in certain embodiments, one or more host adapters, processor portion 160, and one or more device adapters, are disposed on another card disposed in Applicants' information storage and retrieval system. In these embodiments, Applicants' system 100 includes two cards interconnected with a plurality of data storage devices.

In the illustrated embodiment of FIG. 1, sixteen data storage devices are organized into two arrays, namely array "A" and array "B". The illustrated embodiment of FIG. 1 shows two storage device arrays. In other embodiments, Applicants' information storage and retrieval system includes more than two storage device arrays. Each storage array appears to a host computer as one or more logical devices.

In certain embodiments, one or more of the data storage devices comprise a plurality of hard disk drive units. In the illustrated embodiment of FIG. 1, disk array "A" includes disk drives 181, 182, 183, 191, 192, 193, and 194. Disk array "B" includes disk drives 185, 186, 187, 188, 196, 197, and 198. In certain embodiments, arrays "A" and "B" utilize a RAID protocol. In certain embodiments, arrays "A" and "B" comprise what is sometimes called a JBOD array, i.e. "Just a Bunch Of Disks" where the array is not configured according to RAID. As those skilled in the art will appreciate, a RAID (Redundant Array of Independent Disks) rank comprises independent disk drives configured in an array of disk drives to obtain performance, capacity and/or reliability that exceeds that of a single large drive.

The illustrated embodiment of FIG. 1 shows two storage device arrays. In other embodiments, Applicants' system includes a single storage device array. In yet other embodiments, Applicants' system includes more than two storage device arrays.

Figure 2:
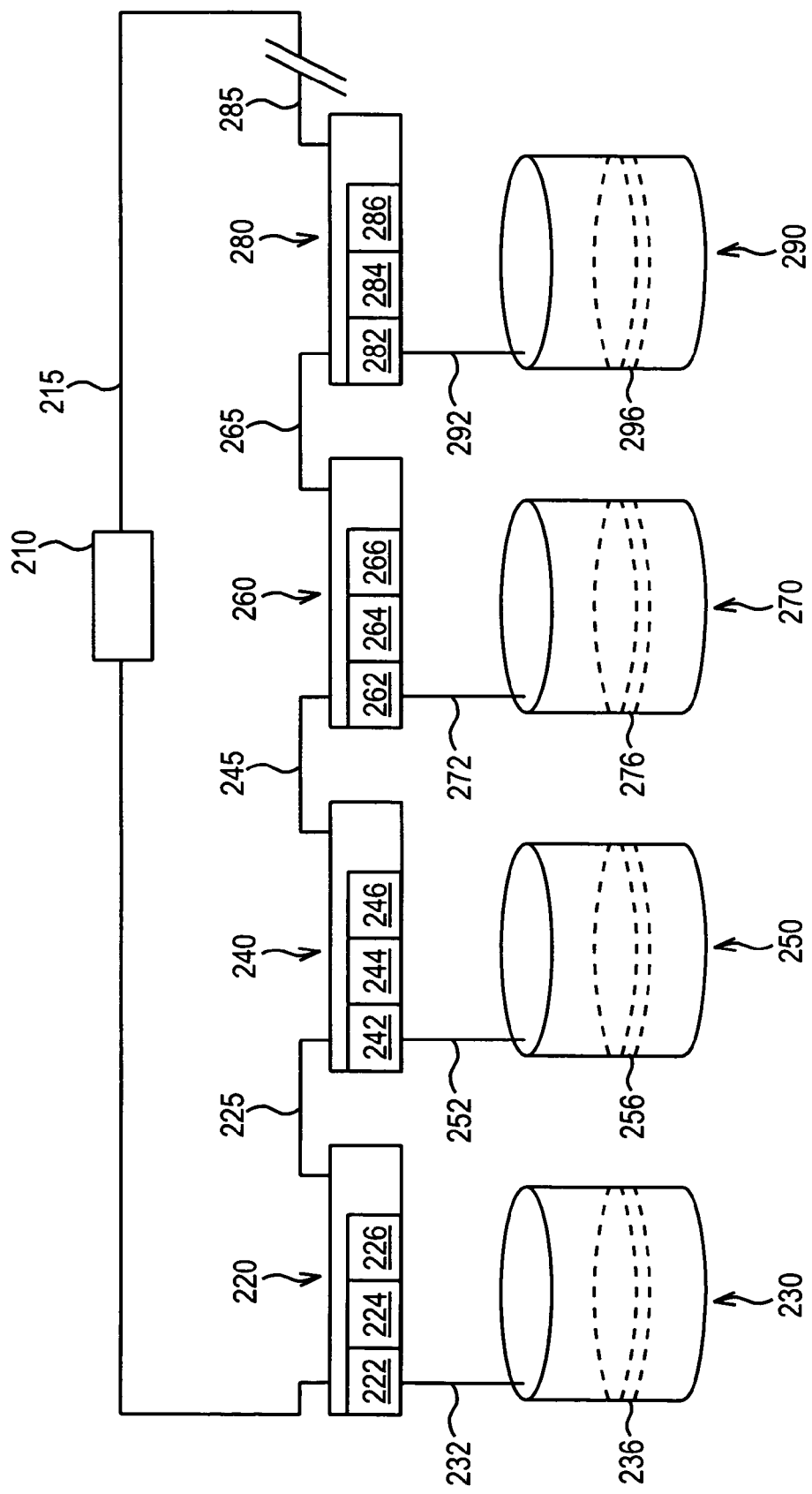
FIG. 2 is a block diagram showing a plurality of sector format conversion devices interconnecting a plurality of data storage devices to a controller.

Referring now to FIG. 2, regardless of the data storage media used in Applicants' information storage and retrieval system, i.e. a plurality of hard disks, each data storage device, which includes one or more of those storage media, is interconnected to a device controller 210 by a communication link 215. In certain embodiments, device controller 210 comprises a device adapter, such as for example device adapter 165 (FIG. 1). In certain embodiments, communication link 215 comprises a Fibre Channel Arbitrated Loop. In the illustrated embodiment of FIG. 2, communication link 215 includes link segments 225, 245, 265, and 285.

The loop structure shown in FIG. 2 comprises one embodiment of Applicant's system. In other embodiments, link 215 comprises a switched fabric or a combination of a switch and loop topologies. In other embodiments, link 215 comprises dual FC-AL loops of switches where the device controller 210 is connected to two FC-AL loops. Each loop contains one or more Fibre Channel switches. The conversion devices 220, 240, etc connect point to point to switches on each loop. In other embodiments, each loop contains a single conversion device that performs a switching function that surfaces multiple point to point devices on each loop.

In some embodiments the conversion device, includes elements to perform sector size conversion from a first sector format to a second sector format ("sector size conversion"), where the communication protocol is the same for the first sector format and the second sector format. In other embodiments, the conversion device includes elements to perform both "sector size conversion" and a conversion from a first communication protocol to a second communication protocol ("protocol conversion"). In some embodiments the first communication protocol is a Fibre Channel Protocol and the second communication protocol is Serial ATA or ATA. In other embodiments, the first communication protocol is Serial Attached SCSI and the second communication protocol is Serial ATA or ATA.

In all embodiments, Applicants' sector format conversion device is capable of sector size conversion. In certain embodiments, Applicants' sector format conversion device is also capable of protocol conversion. References herein to sector format conversion device include Applicants' devices capable of sector format conversion, and also to Applicants' devices capable of sector format conversion and protocol conversion.

Each storage device is interconnected to communication link 215 by a sector format conversion device, such as devices 220, 240, 260, and 280, which interconnect storage devices 230, 250, 270, and 290, respectively, to communication loop 215. Sector format conversion device 220 interconnects storage device 230 to loop 215 by communication link 232.

Communication link 225 interconnects sector format conversion device 220 and sector format conversion device 240. Sector format conversion device 240 interconnects storage device 250 with loop 215 by communication link 252. Communication link 245 interconnects sector format conversion device 240 and sector format conversion device 260. Sector format conversion device 260 interconnects storage device 270 to loop 215 by communication link 272.

Communication link 265 interconnects sector format conversion device 260 and sector format conversion device 280. Sector format conversion device 280 interconnects storage device 290 to loop 215 by communication link 292. Communication link 285 interconnects sector format conversion device 280 and communication loop 215. Communication links 232, 252, 272, and 292, are individually selected from a native drive line such as ATA or S-ATA.

Each sector format conversion device includes a data buffer, such as data buffers 222, 242, 262, and 282. Each sector format conversion device further includes a processor, such as processor 224, 244, 264, and 284. Each sector format conversion device further includes a persistent memory, such a persistent memory 226, 246, 266, and 286. By persistent memory, Applicants mean non-volatile memory, i.e. memory that survives a loss of utility power. In certain embodiments, nonvolatile memory devices 226, 246, 266, and 286, are each individually selected from the group which includes one or more EEPROMs (Electrically Erasable Programmable Read Only Memory), one or more flash memories, battery backup RAM, hard disk drive, combinations thereof, and the like.

In certain embodiments, data received from one or more host computers is initially written to a data cache, such as for example data cache 134 (FIG. 1), disposed in Applicants' information storage and retrieval system, such as system 100 (FIG. 1). In certain embodiments, that data is written to the data cache using a first sector format. In certain embodiments, a host computer writes the data to the storage subsystem using a block storage protocol over link 395 using a sector size other than the native sector size of the disk. In other embodiments, the storage subsystem adds its own data to the data written by the host to generate is own sector size. This is done by prepending and/or appending data to the sector for cases where the host is using a blocked based protocol like SCSI or by breaking a record based data such as ECKD data formats used by zSeries systems into fixed block sectors In certain embodiments, that first sector format comprises 520 bytes of data per sector. In certain embodiments, that first sector format comprises 524 bytes of data per sector. In certain embodiments, that first sector format comprises 528 bytes of data per sector. In certain embodiments of Applicants' method, before providing data to one or more attached storage devices, converts data from the afore-described first sector format to a second sector format. In certain embodiments, that second sector format comprises 512 bytes of data per sector.

In certain embodiments of Applicants' method, the conversion of data from a first sector format to a second sector format is performed by a sector format conversion device, such as for example sector format conversion device 220. Thus, sector format conversion device 220 receives data in the first sector format, converts that data into the second sector format, and then provides that second sector format data to the attached storage device. In certain embodiments, sector format conversion device receives data in the first sector format from a data cache, such as for example data cache 134 (FIG. 1). In certain embodiments, sector format conversion device receives data in the first sector format from a host computer interconnected with Applicants' information storage and retrieval system, such as for example host computer 390 (FIG. 1).

Figure 3A:
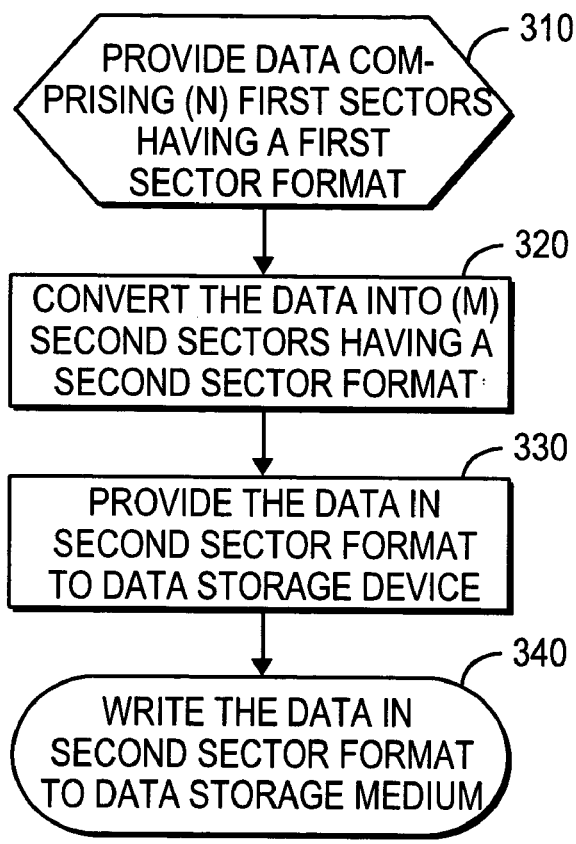
FIG. 3A is a flow chart summarizing Applicants' method.

FIG. 3A summarizes the steps of Applicants' method to convert data from a first sector format to a second sector format while preserving data integrity during a power loss. By "data integrity," Applicants mean that there will never be stored on disk a sector comprising the first sector format, where part of the sector contains new data and part of the sector contains old data from a prior write.

In step 310, Applicants' method provides data comprising (N) first sectors, where each of those (N) first sectors comprise a first sector format. In certain embodiments, that first sector format is selected from the group consisting of 520 byte sectors, 524 byte sectors, and 528 byte sectors.

In certain embodiments, the data comprising (N) first sectors is provided to a sector format conversion device, such as device 220 (FIG. 2) disposed in an information storage and retrieval system, such as for example system 100 (FIG. 1), by one or more host computers, such as for example host computer 390 (FIG. 1). In certain embodiments, the data comprising (N) first sectors is provided to a sector format conversion device, such as device 220 (FIG. 2) disposed in an information storage and retrieval system, such as for example system 100 (FIG. 1), from a data cache disposed within that same information storage and retrieval system, such as for example data cache 134 (FIG. 1).

In step 320, Applicants' method converts the data comprising (N) first sectors to data comprising (M) second sectors, where each of the (M) second sectors comprises a second sector format. In certain embodiments, step 320 is performed by a sector format conversion device, such as device 220 (FIG. 2). As those skilled in the art will appreciate, if the first sector format comprises (X) bytes per sector and if the second sector format comprises (Y) bytes per sector, where (X) is greater than (Y), then (N) is less than (M). Alternatively, if (X) is less than (Y), then (N) is greater than (M).

Figure 4:
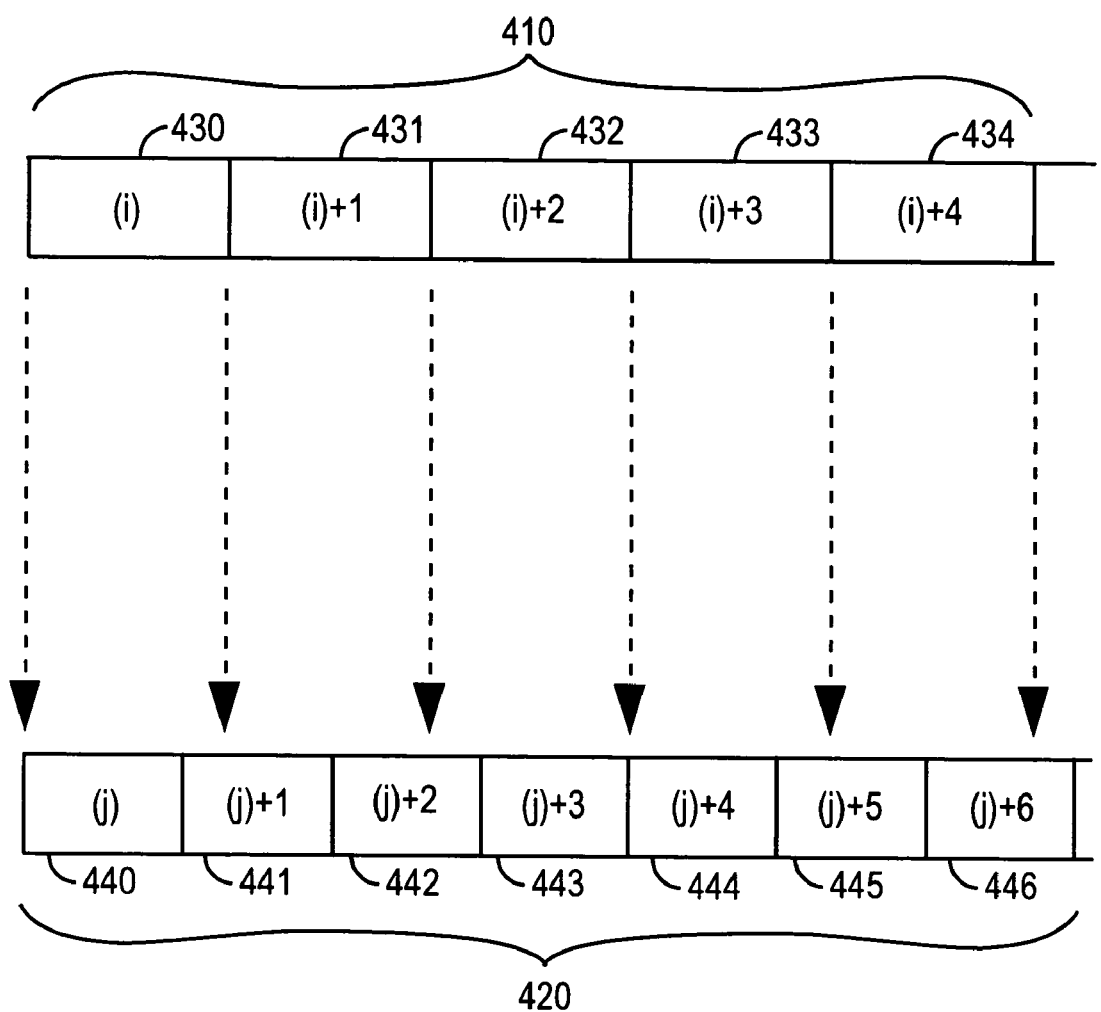
FIG. 4 shows the mapping of data having a first sector format onto a plurality of sectors having a second sector format.

In certain embodiments Applicants' method in step 320 converts data from the first sector format to data comprising the second sector format using an overlay operation. Referring now to FIGS. 3A and 4, in step 310 Applicants' method provides first data, i.e. data 410, comprising a first sector format. FIG. 4 shows data 410 comprising first sectors 430, 431, 432, 433, and 434. First data 410 is shown comprising 5 first sectors for clarity of description. In actual implementation, first data 410 may comprise thousands or more of sectors in the first sector format.

Thus, first data 410 comprises a plurality of first sectors, where that plurality of first sectors are contiguous. By "contiguous," Applicants' mean that the (i)+1th first sector, i.e. first sector 431, is contiguous with both the (i)th first sector, i.e. first sector 430, and the (i)+2th first sector, i.e. first sector 432. Applicants' invention is described herein with reference to sectors. Applicants' invention also applies when using what SCSI refers to as "Logical Blocks".

In step 320, Applicants' method maps first data 410 comprising a plurality of sectors of data written in the first sector format into second data 420 comprising a plurality of sectors of data written in the second sector format by overlaying first data 410 onto a sufficient number of second sectors to form data 420. To maintain the integrity of both the new and pre-existing ("unmodified") data of the first sector format, when performing the overlay of the first sector format on to the second sector format, it is required to pre-fetch the pre-existing data from the storage device second sector format sectors that will include both new and unmodified data after the sector format conversion is completed. In the illustrated embodiment of FIG. 4, the first sector format comprises (X) bytes per sector, and the second sector format comprises (Y) bytes per sector, where (X) is greater than (Y). In certain embodiments, (X) is about 524 and (Y) is about 512. In the illustrated embodiment of FIG. 4, 5 sectors of data having data written in the first sector format, namely sectors 430, 431, 432, 433, and 434, are mapped in step 320 into 7 sectors of data written in the second sector format, namely sectors 440, 441, 442, 443, 444, 445, and 446.

Referring again to FIG. 3A, in step 330 Applicants' method provides the data in second sector format to a storage device. In certain embodiments, step 320 is performed by a sector format conversion device, such as device 220 (FIG. 2), and in step 330 that sector format conversion device provides the data in second sector format to an attached storage device, such as storage device 230 (FIG. 2).

In step 340, the attached storage device writes the data in second sector format to a storage medium disposed in the data storage device. In certain embodiments, the data storage medium is removeable disposed in the data storage device, e.g. a USB attached flash memory drive. In other embodiments, the storage medium is permanently disposed within the storage device, such as a hard disk disposed within a hard disk drive unit.

In certain embodiments, the first data of step 310 is stored in a buffer, such as buffer 222, disposed within Applicants' sector format conversion device, such as device 220. In certain embodiments of Applicants' method, the pre-existing data stored on the plurality of contiguous second sector format sectors on a storage device, such as device 230, are "pre-fetched" from the storage device and stored in a buffer, such as device 222 in step 320. In certain embodiments, in step 330 the converted data is provided to the storage device substantially synchronously with the data conversion of step 320. In other embodiments, the converted data is written to a buffer in the sector format conversion device for later transmission to the storage device.

Figure 3B:
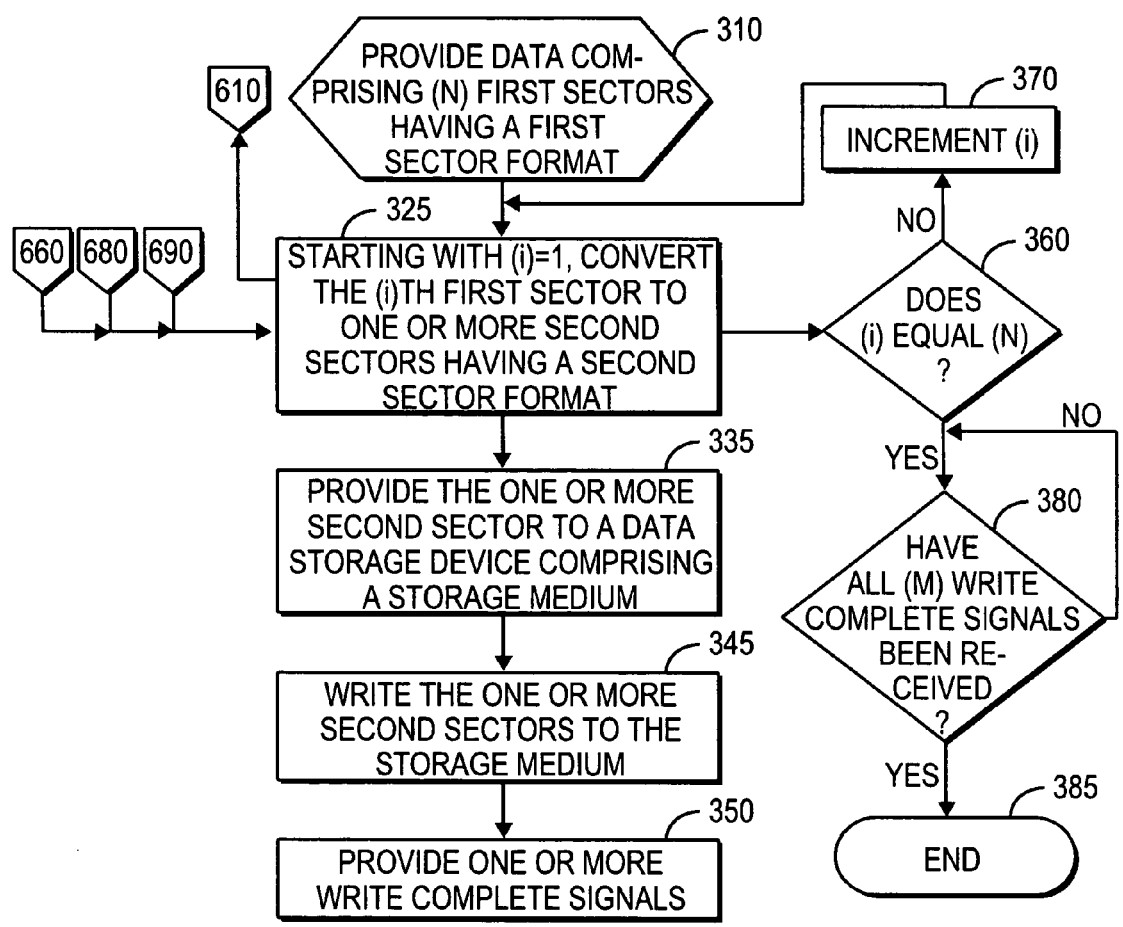
FIG. 3B is a flow chart summarizing additional steps in Applicants' method.

In certain embodiments, the method of FIG. 3A is implemented using the steps shown in FIG. 3B. In these embodiments, Applicants' method maps the first data into the second data sequentially starting with the initial first sector of that first data and proceeding seriatim until the final first sector of the first data has been converted into the second sector format. In step 325, Applicants' method takes the (i)th first sector, where (i) is initially set to 1, and overlays that (i)th first sector onto one or more second sectors that were "pre-fetched" into the buffer device in step 320. In the illustrated embodiment of FIG. 4, step 325 includes overlaying the (i)th first sector, i.e. first sector 430, onto the (j)th and the (j)+1th second sectors, i.e. second sectors 440 and 441. In this process of overlaying the (i)th first sector, onto the (j)th and the (j)+1 th, it may be required to create the (j)th second sector with a portion of the "pre-existing" data that was "pre-fetched" from the storage medium to maintain the alignment and integrity of the data of the first sector format. The technique of overlaying of new data and "pre-existing pre-fetched" data must also be performed on the last or final sector of the plurality of contiguous second sector format sectors to maintain the integrity of the first sector data format. Applicants' method transitions to both step 335 and 360 from step 325.

In step 335, Applicants' method provides the (j)th and the (j)+1th second sectors to the data storage device. In step 345, the data storage device, such as data storage device 230 (FIG. 2), writes the (j)th and the (j)+1th second sectors to the storage medium disposed therein, such as data storage medium 236 (FIG. 2). In step 350, after writing the (j)th and the (j)th+1 second sectors to the storage medium the data storage device provides a Write Complete Signal. For example, in step 350 data storage device 230 (FIG. 2) provides a Write Complete Signal to sector format conversion device 220 (FIG. 2).

In step 360, Applicants' method determines if all the (N) first sectors have been overlayed on the requisite number of second sectors, i.e. if (i) equals (N). If Applicants' method determines in step 360 that (i) does not equal (N), i.e. certain data in the first sector format remains to be converted into the second sector format, then the method transitions from step 360 to step 370 wherein the method increments (i). Applicants' method transitions from step 370 to step 325 and continues as described above.

Applicants' method of FIG. 3B performs a plurality of steps synchronously. For example, data in the first sector format is being converted into data having the second sector format in step 325, while at the same time previously converted data may be being sent by one or more sector format conversion devices to one or more storage devices in step 335, while at the same time previously converted data may be being written to one or more storage media in step 345 by one or more data storage devices, while at the same time in step 350 one or more data storage devices may be providing write complete signals, while at the same time Applicants' method is determining in step 360 if all the data has been converted or is determining in step 380 if all (M) write complete signals have been received.

In certain embodiments, Applicants' method to convert data from a first sector format into data comprising a second sector is compliant with Section 6.4.8.2., entitled "Power Failure Warning," of SFF Specification SFF-8045 (hereinafter referred to as the "PFW Specification," which is hereby incorporated by reference. As those skilled in the art will appreciate, the SFF Committee is an ad hoc group formed to address disk industry needs in a prompt manner. When formed in 1990, the original goals were limited to defining de facto mechanical envelopes for disk drives so they could fit into laptop computers and other small products. In November 1992, the SFF Committee objectives broadened to encompass other areas which needed prompt industry action. SFF Specifications are narrow in scope, to reduce development time. Among other requirements, the PFW Specification mandates that when write caching, a data storage device must stop writing data to nonvolatile storage on a block boundary.

In certain embodiments, one or more of Applicants' data storage devices, such as for example data storage device 230, comprise what is sometimes referred a "S-ATA" device. In certain embodiments, one or more of Applicants' data storage devices employs what is sometimes referred to as IDE/ATA disk-interface technology.

As those skilled in the art will appreciate, a S-ATA device employs a Serial ATA disk-interface technology. S-ATA is based upon serial signaling technology. Serial ATA is a point-to-point connection and allows multiple ports to be aggregated into a single controller, such as for example controller 210 (FIG. 2). S-ATA storage devices do not necessarily support the PFW Specification.

Applicants' method is PFW Specification compliant, even when using one or more storage devices that do not individually support the PFW Specification. In the event a PFW signal is received by Applicants' apparatus while converting data from a first sector format to a second sector format, Applicants' method transitions to a PFW algorithm. Using that PFW algorithm, after receiving a PFW signal, Applicants' method creates and saves two additional second sectors, and saves those two second sectors before the onset of the power loss event.

Figure 6:
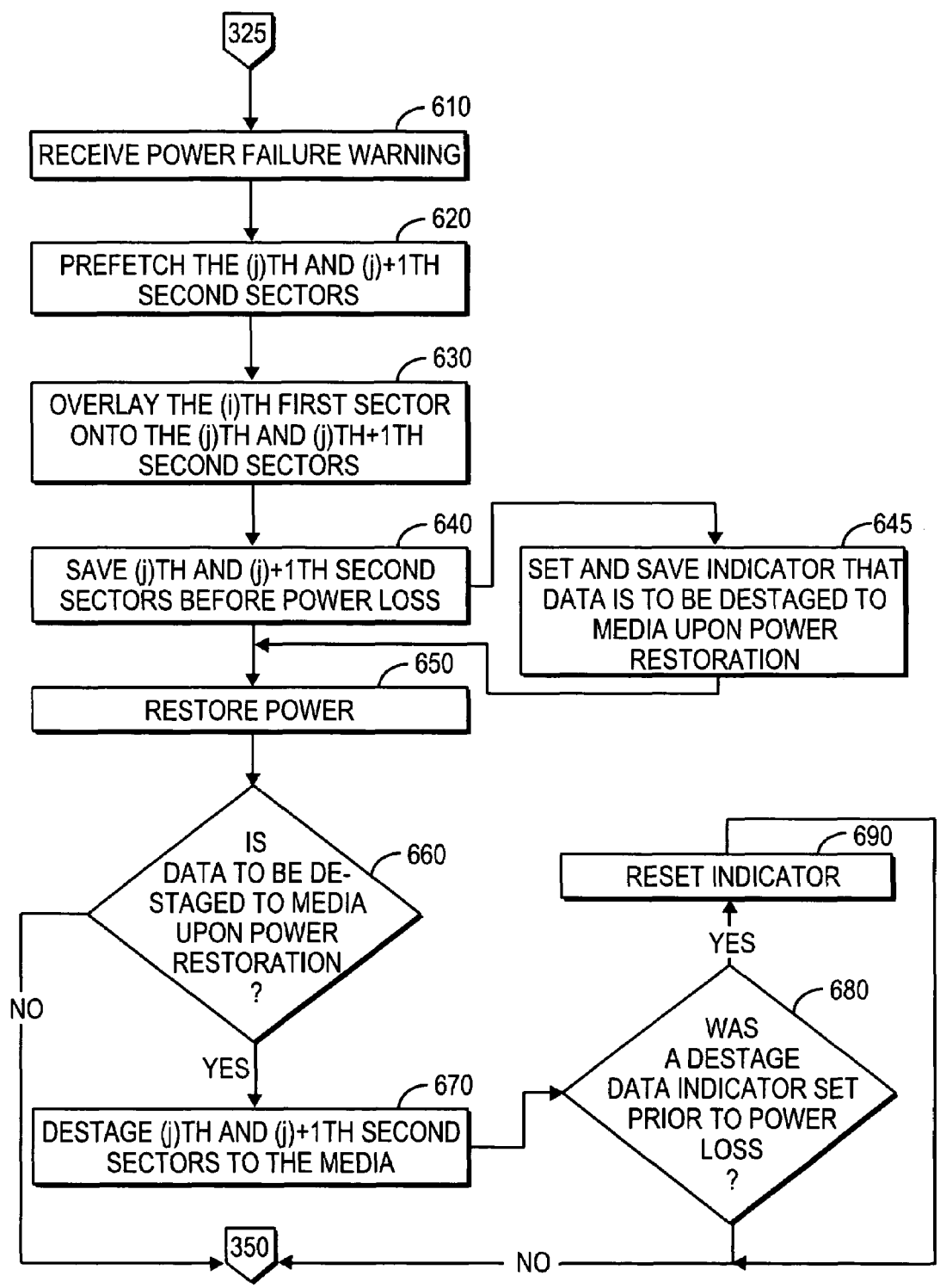
FIG. 6 is a flow chart summarizing the steps of Applicants' Power Warning Failure algorithm.

In the event Applicants' apparatus generates and/or receives a PFW signal while performing the method of FIG. 3B, Applicant's method transitions to Applicants' PFW algorithm. Applicants' PFW algorithm is summarized in FIG. 6. Referring now to FIGS. 3 and 6, Applicants' method transitions to step 610 upon detection of a PFW signal. Step 610 includes receiving that PFW signal.

FIG. 3B shows Applicants' method transitioning from step 325 to step 610. As noted above, Applicants' method may be performing steps 325, 335, 345, 350, and either step 360 or step 380, synchronously. If any one or more of steps 325, 335, 345, 350, 360 and/or, 380, are being performed and a PFW signal is received, Applicants' method transitions to step 610.

Figure 5A:
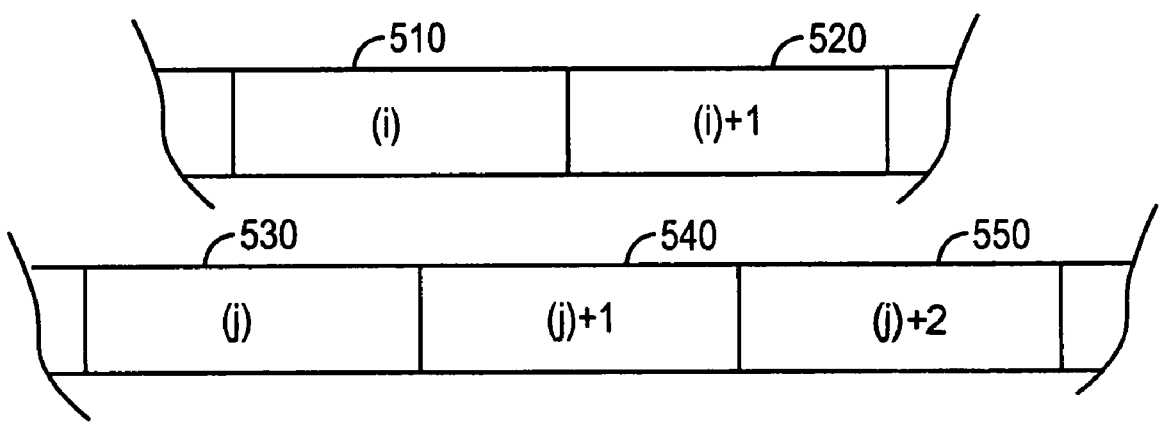
FIG. 5A shows the mapping of a plurality of first sectors onto a plurality of second sectors.
Figure 5B:
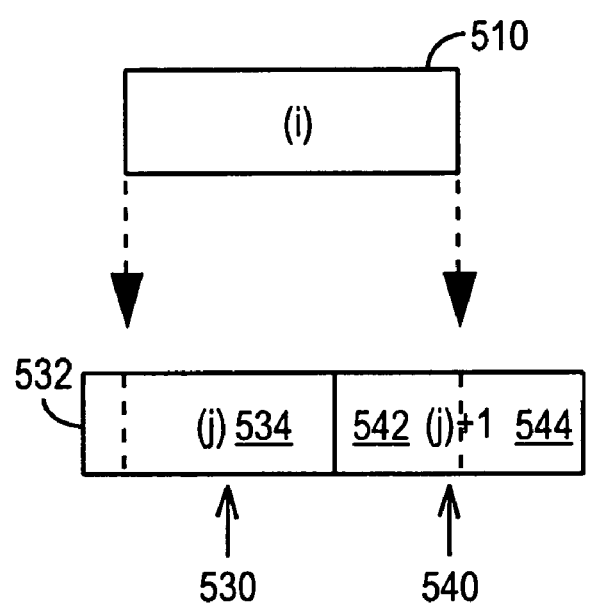
FIG. 5B shows the mapping of a single first sector onto two second sectors.

After receiving a PFW signal in step 610, Applicants' method completes the formation of two additional second sectors. For example and referring now to FIG. 5A, if Applicants' method is overlaying a plurality of contiguous first sectors, such as the (i)th first sector, the (1)+1th first sector, the (1)+2th second sector, and the like, onto a plurality of contiguous second sectors, such as the (j)th second sector, (j)+1th second sector, the (j)+2th second sector, and the like, when a PFW signal is received, then in step 620 Applicants' method fetches only the (j)th and the (j)+1th second sectors that were "pre-fetched" from the storage medium and stored in the data buffer. In step 630, Applicants' method overlays the (i)th first sector onto the (j)th and the (j)+1th second sectors.

In step 640, Applicants' method saves the newly formed (j)th and (j)+1th second sectors before the onset of the utility power loss event. By "utility power," Applicants mean power continuously provided by a commercial and/or captive power generator generation facility external to Applicants' information storage and retrieval system. In certain embodiments, Applicants' method in step 640 saves those newly written (j)th and (j)+1th second sectors in persistent memory, such as memory 226 (FIG. 2), disposed in the sector format conversion device, such as device 220 (FIG. 2). In other embodiments, Applicants' method in step 640 writes those newly written (j)th and (j)+1 th second sectors to the storage media, such as for example storage medium 236 (FIG. 6) disposed in storage device 230 (FIG. 2). In certain embodiments, Applicants' method transitions from step 640 to step 650.

In certain embodiments, Applicants' method includes step 645 wherein the method sets and saves an indicator that data is to be written to media upon power restoration. In certain embodiments, the indicator of step 645 comprises a flag disposed in device microcode written to the persistent memory in the sector format conversion device, where that flag can be set to one of two values. In certain embodiments, that flag comprises a bit which can be set to either "0" or to "1," wherein a setting of "1" indicates that data is to be written to media upon power restoration.

Applicants' method transitions from step 645 to step 650, wherein the utility power is restored to Applicants' information storage and retrieval system. Applicants' method transitions from step 650 to step 660 wherein the method determines if saved data in second sector format needs to be destaged to media. In certain embodiments, step 660 includes examining the indicator set and saved in step 645.

If Applicants' method determines in step 660 that no saved data in second sector format needs to be destaged to media, then Applicants' method transitions from step 660 to step 325 (FIG. 3B) and continues as described above. Alternatively, if Applicants' method determines in step 660 that saved data in second sector format needs to be destaged to media, then Applicants' method transitions from step 660 to step 670 wherein the method destages the (j)th and the (j)+1th second sector to an attached data storage device comprising a data storage medium. In certain embodiments, step 670 is performed by a controller, such as controller 210 (FIG. 2), interconnected with one or more sector format conversion devices. In certain embodiments, step 670 is performed by a sector format conversion device, such as device 230 (FIG. 2).

Applicants' method transitions from step 670 to step 680 wherein the method determines if a data indicator was set prior to loss of utility power, i.e. if the indicator of step 645 was set. If Applicants' method determines in step 680 that a destage indicator was not set, then Applicants' method transitions from step 680 to step 325 (FIG. 3B) and continues as described above. Alternatively, if Applicants' method determines in step 680 that a destage indicator was set, then Applicants' method transitions from step 680 to step 690 wherein the method resets that destage indicator. For example, if a bit was set to "1" in step 645 before a utility power loss, then after destaging the saved second sectors to media in step 690 the method resets that bit to "0". Applicants' method transitions from step 690 to step 325 and continues as described above.

The embodiments of Applicants' method recited in FIGS. 3A, 3B, and/or 6, may be implemented separately. Moreover, in certain embodiments, individual steps recited in FIGS. 3A, 3B, and/or 6, may be combined, eliminated, or reordered.

In certain embodiments, Applicants' invention includes instructions residing in memory, such as for example memory 133 (FIG. 1) and/or memory 143 (FIG. 1), and/or memory 226 (FIG. 2), and/or memory 246 (FIG. 2), and/or memory 266 (FIG. 2), and/or memory 286 (FIG. 2), where those instructions are executed by processor 132 (FIG. 1), 142 (FIG. 1), 224 (FIG. 2), 244 (FIG. 2), 264 (FIG. 2), and/or 284 (FIG. 2), respectively, to performs steps 310, 320, 330, and 340, recited in FIG. 3A, and/or steps 325, 335, 345, 350, 360, 370, 380, and/or 385, recited in FIG. 3B, and/or steps 610, 620, 630, 640, 645, 650, 660, 670, 680, and/or 690, recited in FIG. 6.

In other embodiments, Applicants' invention includes instructions residing in any other computer program product, where those instructions are executed by a computer external to, or internal to, system 100, to perform steps 310, 320, 330, and 340, recited in FIG. 3A, and/or steps 325, 335, 345, 350, 360, 370, 380, and/or 385, recited in FIG. 3B, and/or steps 610, 620, 630, 640, 645, 650, 660, 670, 680, and/or 690, recited in FIG. 6. In either case, the instructions may be encoded in an information storage medium comprising, for example, a magnetic information storage medium, an optical information storage medium, an electronic information storage medium, and the like. By "electronic storage media," Applicants mean, for example, a device such as a PROM, EPROM, EEPROM, Flash PROM, compactflash, smartmedia, and the like.

While the preferred embodiments of the present invention have been illustrated in detail, it should be apparent that modifications and adaptations to those embodiments may occur to one skilled in the art without departing from the scope of the present invention as set forth in the following claims.

We claim:

1. A method to protect data integrity during loss of power to an information storage and retrieval system, comprising the steps of:

providing an information storage and retrieval system comprising information comprising (N) first sectors written in a first sector format, a device controller, a data storage device, wherein said data storage device comprises an information storage medium comprising (M) second sectors each comprising a second sector format, a sector format conversion device, a communication link interconnecting said sector format conversion device and said device controller, wherein said sector format conversion devices is interconnected with said data storage device;

sending the (i)th first sector to said sector format conversion device, wherein (i) is initially set to 1, and wherein (i) is greater than or equal to 1 and less than or equal to (N);

overlaying by said sector format conversion device said (i)th first sector onto part or all of the (j)th second sector, wherein (j) is greater than or equal to 1 less than or equal to (M);

transmitting said (j)th second sector to said data storage device;

writing said (j)th second sector to said information storage medium;

determining if a power failure warning has been received;

operative if a power failure warning is received:

prefetching the (j)+1th second sector;

overlaying the (i)+1th first sector onto part of all of said (j)+1th second sector;
saving said (j)+1th second sector;
losing utility power to said information storage and retrieval system;
restoring utility power to said information storage and retrieval system;
destaging said (j)+1th second sector to said data storage device; and
encoding said (j)+1th second sector to said information storage medium.

2. The method of claim 1, further comprising the steps of:
operative if a power failure warning is not received, ascertaining if (i)+1 equals (N);
operative if (i)+1 does not equal (N):
incrementing (i);
incrementing (j);
repeating said sending step, converting step, transmitting step, writing step, ascertaining step, and optionally said incrementing steps.

3. The method of claim 1, wherein:
said overlaying the (i)th first sector step comprises overlaying by said sector format conversion device said (i)th first sector to part or all of the (j)th and onto part or all of the (j)+1)th second sector, wherein (j) is greater than or equal to 1 and wherein (j)+1 is less than or equal to (M);
said transmitting step comprises transmitting said (j)th second sector and said (j)+1th second sector to said data storage device;
said writing step comprises writing said (j)th second sector and said (j)+1th second sector, to said information storage medium;
said prefetching step comprises prefetching the (j)+2th second sector and the (j)+3th second sector;
said overlaying the (i)+1th first sector step comprises overlaying the (i)+1th first sector onto part of all of said (j)+2th second sector and onto part or all of said (j)+3th second sector;
said saving step comprises saving said (j)+2th and said (j)+3th second sectors;
said destaging step comprises destaging said (j)+2th second sector and said (j)+3th second sector to said data storage device; and
said encoding step comprises encoding said (j)+2th second sector and said (j)+3th second sector to said information storage medium.

4. The method of claim 1, further comprising the step of selecting said first sector format from the group consisting of 520 byte sectors, 524 byte sectors, and 528 byte sectors.

5. The method of claim 1, further comprising the step of setting said second sector format to comprise 512 byte sectors.

6. The method of claim 1, further comprising the steps of:
providing an indicator having either a first value or a second value;
setting said indicator to said second value after saving said (j)+1th second sector, and before losing power to said information storage and retrieval system;
after restoration of power to said information storage and retrieval system, determining if said indicator is set to said second value;
operative if said indicator is set to said second value, providing said (j)+1th second sector to said data storage device.

7. The method of claim 6, further comprising the step of resetting said indicator to said first value after providing said (j)+1th second sector to said data storage device.

8. The method of claim 6, further comprising the step of providing a flag disposed in said processor, wherein said flag comprises said indicator.

9. An article of manufacture comprising a computer useable medium having computer readable program code disposed therein to preserve data integrity during a loss of utility power, said article of manufacture further comprising information comprising (N) first sectors written in a first sector format, a device controller, a data storage device, wherein said data storage device comprises an information storage medium comprising (M) second sectors each comprising a second sector format, a sector format conversion device, a communication link interconnecting said sector format conversion device and said device controller, wherein said sector format conversion devices is interconnected with said data storage device, the computer readable program code comprising a series of computer readable program steps to effect:
sending the (i)th first sector to said sector format conversion device, wherein (i) is initially set to 1, and wherein (i) is greater than or equal to 1 and less than or equal to (N);
converting by said sector format conversion device said (i)th first sector to part or all of the (j)th second sector, wherein (j) is greater than or equal to 1 less than or equal to (M);
transmitting said (j)th second sector to said data storage device;
writing said (j)th second sector to said information storage medium;
determining if a power failure warning has been received;
operative if a power failure warning is received:
prefetching the (j)+1th second sector;
overlaying the (i+1)th first sector onto part of all of said (j)+1th second sector;
saving said (j)+1th second sector before loss of utility power;
upon restoration of utility power to said information storage and retrieval system, destaging said (j)+1th second sector to said data storage device; and
encoding said (j)+1th second sector to said information storage medium.

10. The article of manufacture of claim 9, said computer readable program code further comprising a series of computer readable program steps to effect:
overlaying said (i)th first sector to part or all of the (j)th and part or all of the (j+1)th second sector, wherein (j) is greater than or equal to 1 and wherein (j)+1 is less than or equal to (M);
transmitting said (j)th second sector and said (j)+1th second sector to said data storage device;
writing said (j)th second sector and said (j)+1th second sector to said information storage medium;
prefetching the (j)+2th second sector and the (j)+3th second sector;
overlaying the (i+1)th first sector onto part of all of said (j)+2th second sector and onto part or all of said (j)+3th second sector;
saving said (j)+2th and said (j)+3th, second sectors prior to loss of utility power;
after restoration of utility power, destaging said (j)+2th second sector and said (j)+3th second sector to said data storage device; and
encoding said (j)+2th second sector and said (j)+3th second sector to said information storage medium.

11. The article of manufacture of claim 9, said computer readable program code further comprising a series of computer readable program steps to effect selecting said first sector format from the group consisting of 520 byte sectors, 524 byte sectors, and 528 byte sectors.

12. The article of manufacture of claim 9, said computer readable program code further comprising a series of computer readable program steps to effect setting said second sector format to comprise 512 byte sectors.

13. The article of manufacture of claim 9, wherein said article of manufacture further comprises an indicator having either a first value or a second value, said computer readable program code further comprising a series of computer readable program steps to effect:
   setting said indicator to said second value after saving said (j)+1th second sector, and before losing power to said information storage and retrieval system;
   after restoration of power to said information storage and retrieval system, determining if said indicator is set to said second value;
   operative if said indicator is set to said second value, providing said (j)+1th second sector to said data storage device.

14. The article of manufacture of claim 13, said computer readable program code further comprising a series of computer readable program steps to effect resetting said indicator to said first value after providing said (j)+1th second sector to said data storage device.

15. A computer program product usable with a programmable computer processor having computer readable program code embodied therein to preserve data integrity during a loss of utility power to an information storage and retrieval system comprising information comprising (N) first sectors written in a first sector format, a device controller, a data storage device, wherein said data storage device comprises an information storage medium comprising (M) second sectors each comprising a second sector format, a sector format conversion device, a communication link interconnecting said sector format conversion device and said device controller, wherein said sector format conversion devices is interconnected with said data storage device, comprising:
   computer readable program code which causes said programmable computer processor to send the (i)th first sector to said sector format conversion device, wherein (i) is initially set to 1, and wherein (i) is greater than or equal to 1 and less than or equal to (N);
   computer readable program code which causes said programmable computer processor to overlay said (i)th first sector onto part or all of the (j)th second sector, wherein (j) is greater than or equal to 1 less than or equal to (M);
   computer readable program code which causes said programmable computer processor to transmit said (j)th second sector to said data storage device;
   computer readable program code which causes said programmable computer processor to write said (j)th second sector to said information storage medium;
   computer readable program code which causes said programmable computer processor to determine if a power failure warning has been received;
   computer readable program code which, if a power failure warning is received causes said programmable computer processor to:
   prefetch the (j)+1 th second sector;
   overlay the (i+1)th first sector onto part of all of said (j)+1th second sector;
   save said (j)+1th second sector prior to loss of utility power;
   upon restoration of utility power to said information storage and retrieval system, destage said (j)+1th second sector to said data storage device; and
   encode said (j)+1th second sector to said information storage medium.

16. The computer program product of claim 15, further comprising:
   computer readable program code which causes said programmable computer processor to overlay said (i)th first sector to part or all of the (j)th and onto part or all of the (j)+1)th second sector, wherein (j) is greater than or equal to 1 and wherein (j)+1 is less than or equal to (M);
   computer readable program code which causes said programmable computer processor to transmit said (j)th second sector and said (j)+1th second sector to said data storage device;
   computer readable program code which causes said programmable computer processor to write said (j)th second sector and said (j)+1th second sector to said information storage medium;
   computer readable program code which causes said programmable computer processor to prefetch the (j)+2th second sector and the (j)+3th second sector;
   computer readable program code which causes said programmable computer processor to overlay the (i+1)th first sector onto part of all of said (j)+2th second sector and onto part or all of said (j)+3th second sector;
   computer readable program code which causes said programmable computer processor to save said (j)+2th, and optionally said (j)+3th, second sectors;
   computer readable program code which causes said programmable computer processor to destage said (j)+2th second sector, and optionally said (j)+3th second sector to said data storage device; and
   computer readable program code which causes said programmable computer processor to encode said (j)+2th second sector, and optionally said (j)+3th second sector, to said information storage medium.

17. The computer program product of claim 15, further comprising computer readable program code which causes said programmable computer processor to select said first sector format from the group consisting of 520 byte sectors, 524 byte sectors, and 528 byte sectors.

18. The computer program product of claim 15, further comprising computer readable program code which causes said programmable computer processor to set said second sector format to comprise 512 byte sectors.

19. The computer program product of claim 15, wherein said information storage and retrieval system further comprises an indicator having either a first value or a second value, further comprising:
   computer readable program code which causes said programmable computer processor to set said indicator to said second value after saving said (j)+1 th second sector, and before losing power to said information storage and retrieval system;
   computer readable program code which, after restoration of power to said information storage and retrieval system, causes said programmable computer processor to determine if said indicator is set to said second value;
   computer readable program code which, if said indicator is set to said second value, causes said programmable computer processor to provide said (j)+1th second sector to said data storage device.

20. The computer program product of claim 19, further comprising computer readable program code which causes said programmable computer processor to reset said indicator to said first value after providing said (j)+1th second sector to said data storage device.

* * * * *